Nov. 7, 1944.  F. H. SHEPARD, JR  2,362,412
REMOTE CONTROL SYSTEM
Filed June 25, 1938   7 Sheets-Sheet 1
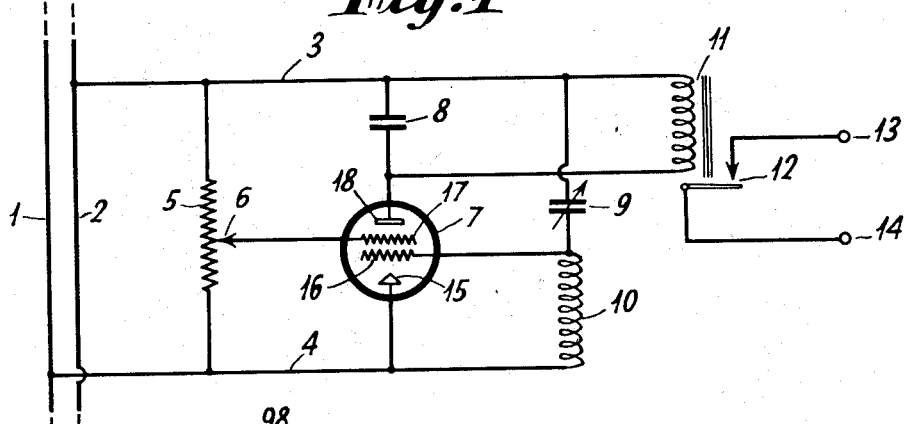
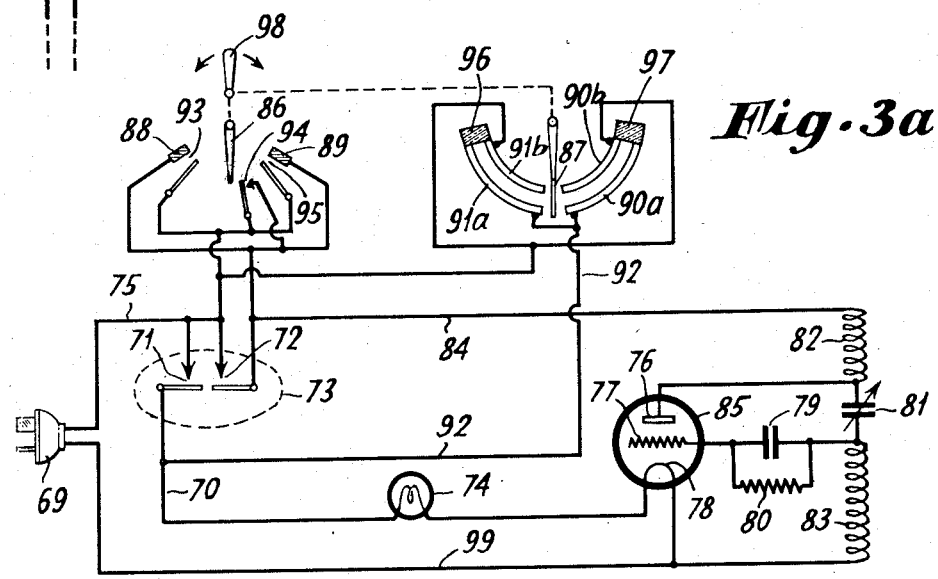
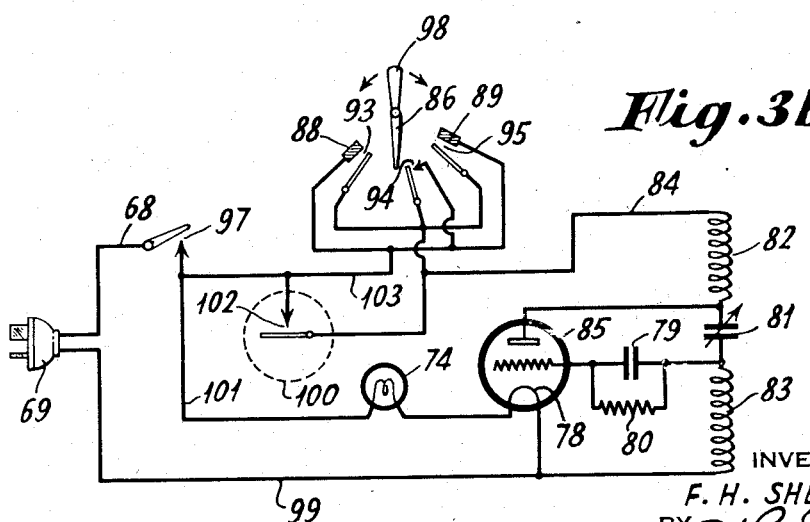
INVENTOR
F. H. SHEPARD JR.
BY H. S. Grover
ATTORNEY

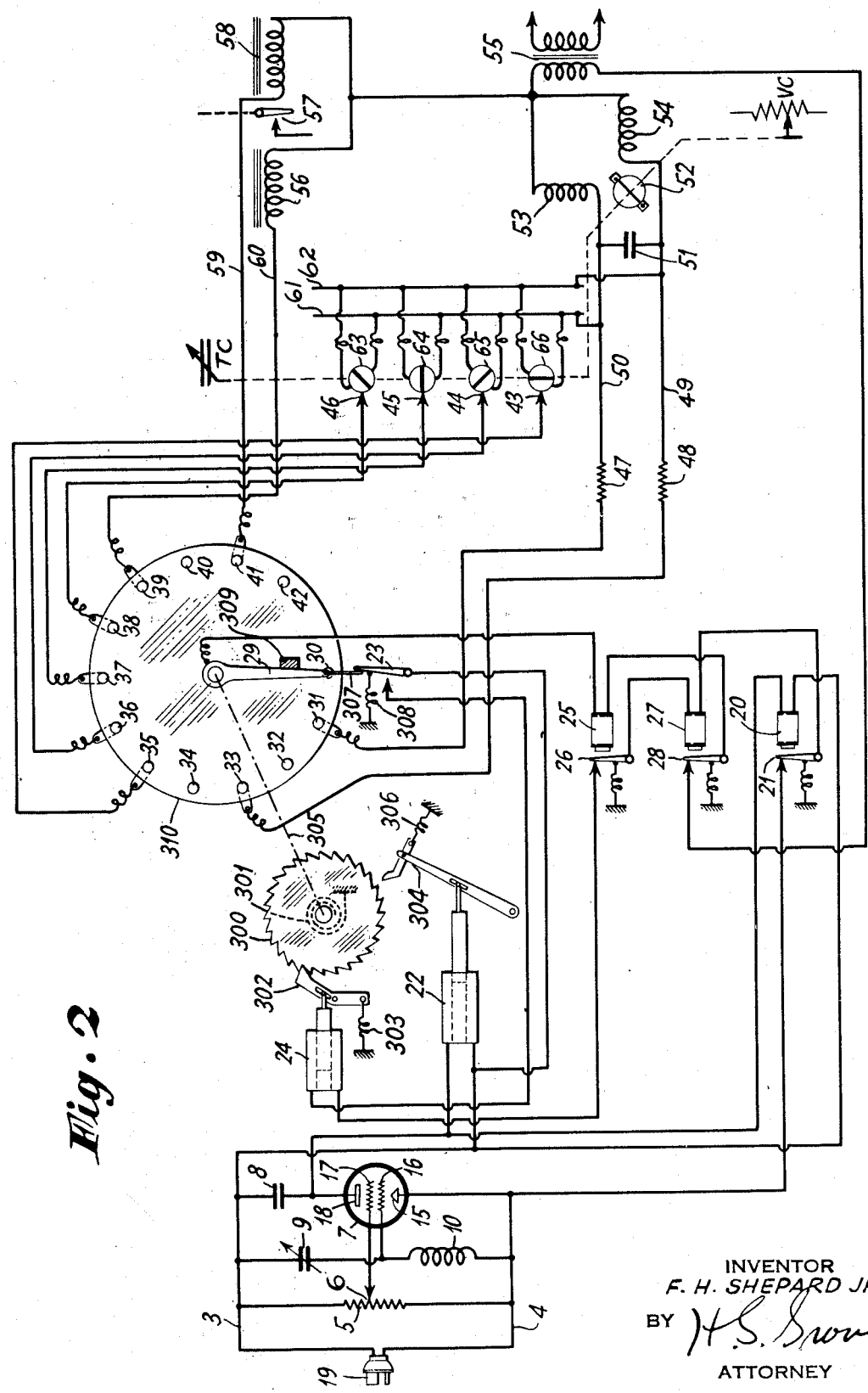

Nov. 7, 1944.　　　F. H. SHEPARD, JR　　　2,362,412
REMOTE CONTROL SYSTEM
Filed June 25, 1938　　　7 Sheets-Sheet 3

INVENTOR
F. H. SHEPARD JR.
BY
ATTORNEYS

Nov. 7, 1944.  F. H. SHEPARD, JR  2,362,412
REMOTE CONTROL SYSTEM
Filed June 25, 1938  7 Sheets-Sheet 4
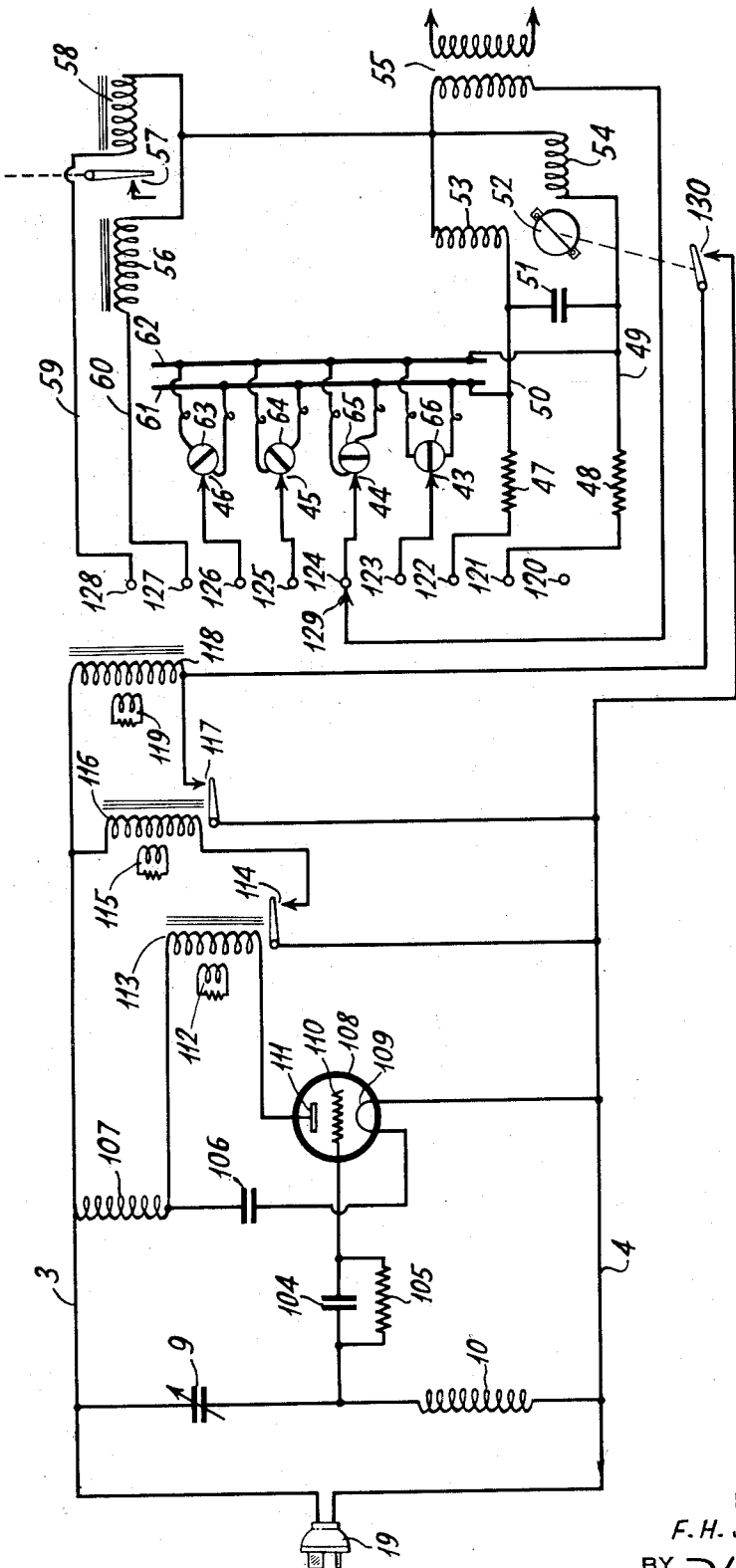
Fig. 4a
INVENTOR
F. H. SHEPARD JR.
BY 
ATTORNEY

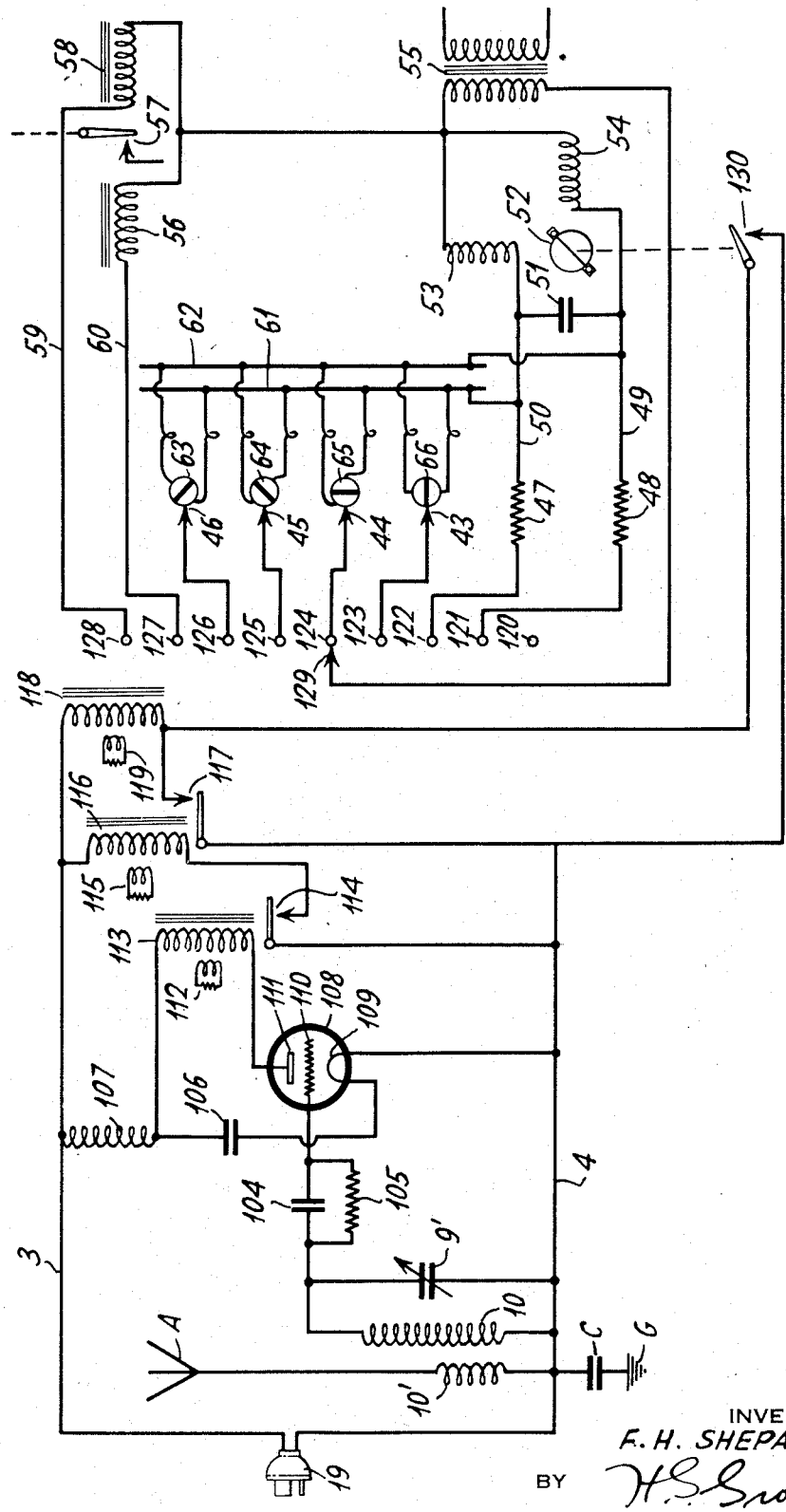

Nov. 7, 1944.　　　　F. H. SHEPARD, JR　　　　2,362,412
REMOTE CONTROL SYSTEM
Filed June 25, 1938　　　　7 Sheets-Sheet 6
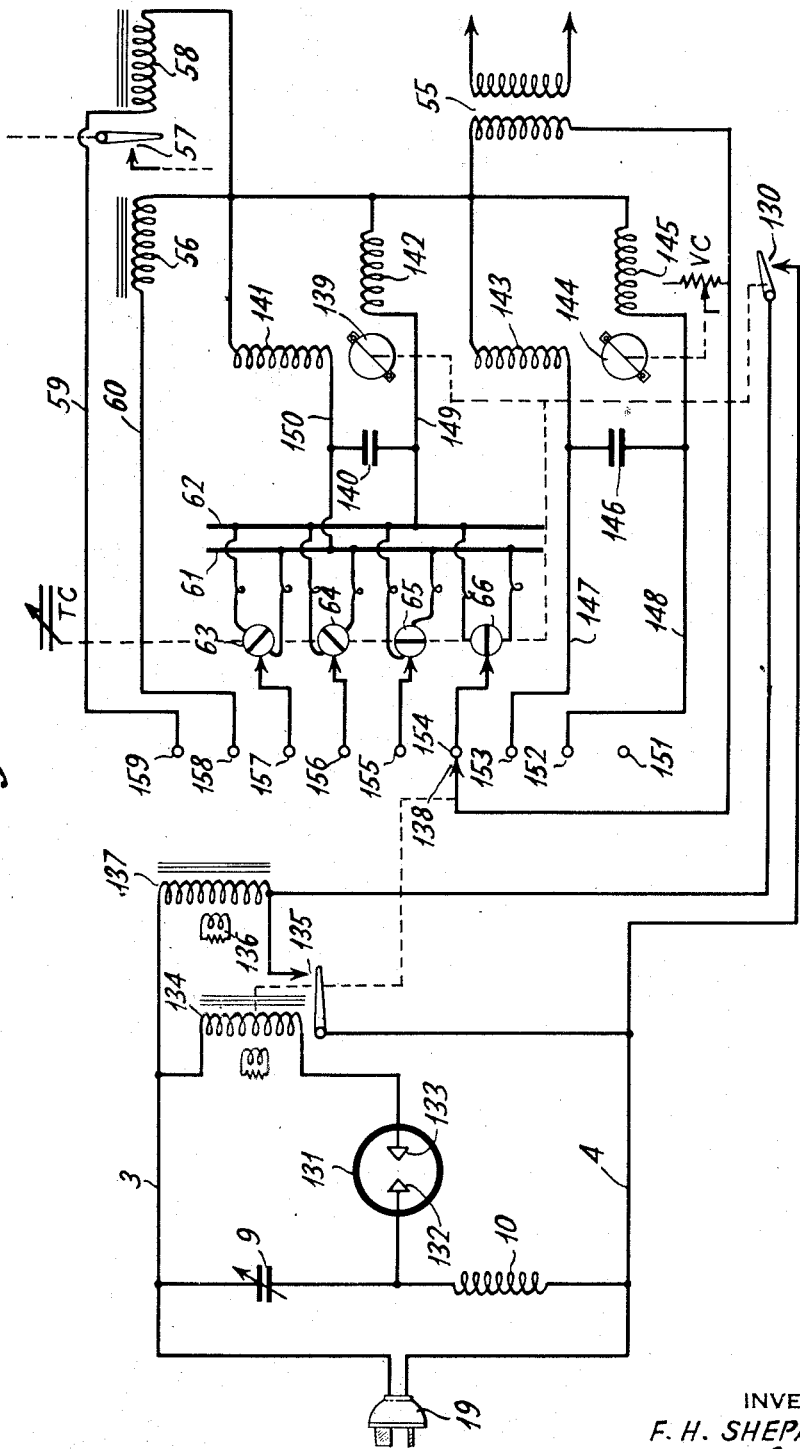
INVENTOR
F. H. SHEPARD JR.
BY H. S. Grover
ATTORNEY Nov. 7, 1944. F. H. SHEPARD, JR 2,362,412
REMOTE CONTROL SYSTEM
Filed June 25, 1938 7 Sheets-Sheet 7

INVENTOR
F. H. SHEPARD JR.
BY
ATTORNEY

Patented Nov. 7, 1944

2,362,412

UNITED STATES PATENT OFFICE 2,362,412

REMOTE CONTROL SYSTEM

Francis H. Shepard, Jr., Rutherford, N. J., assignor to Radio Corporation of America, a corporation of Delaware Application June 25, 1938, Serial No. 215,731

8 Claims. (Cl. 250—20)

The present invention relates broadly to remote control apparatus and more particularly to a system for controlling the operation of a stepswitch from a remote point.

In a more specific sense the invention relates to a system for the complete remote control operation of radio receivers over a power supply line without making use of any auxiliary wires between the radio receiver and the remote control point.

An object of the invention is to provide a novel system of remote control operation of a stepswitch by transmitting control electrical impulses to cause the operation of the step-switch to any one of its various contact positions or steps and thereby provide for the selective operation of any number of devices associated with the various contacts of the step-switch. When the invention is applied to a radio receiver the stepswitch may be utilized to turn the receiver "on" and "off," to control the volume, and to tune to various stations. In conjunction with a radio receiver of the "push-button" type, the stepswitch may be utilized to perform the equivalent functions performed by pressing the various push-buttons of the receiver.

It is generally known that radio receiving apparatus may be controlled by the operation of electrical devices the operations of which are initiated by the closing of contacts operated by push buttons. In such systems the various push buttons are used to initiate or to cause the radio set to perform certain predetermined functions. In order to provide practical remote control for radio receivers and the like it has heretofore been necessary to use a cable containing a multiplicity of wires for connecting the control mechanism at the remote point to the control mechanism at the radio set. In general, it has been found that a cable is both inconvenient and undesirable. This invention provides an arrangement which eliminates the necessity for a cable by providing a carrier operated relay device which may be used to operate contacts or to supply power to operate a step-switch mechanism connected so as to perform the same functions as are now performed by pressing the various buttons of a push-button receiver, i. e., shorting the button operated switches to get the same effect as is obtained by operating a button of one of the known conventional pushbutton systems. As the relay is caused to operate by the reception of a carrier, this carrier can consist of pulses of radio frequency received by direct radiation through space or be guided over the existing power lines. The relay may consist of a thermionic device which will control enough energy directly to operate a step-switch or it may operate an electrical mechanical relay which will in turn control or interrupt energy to the step switch.

In using a step switch to control a conventional push button tuned radio set, there are three factors that must be taken into account. First, the step switch must be pulsed one step at a time until the proper connections are made, i. e., until the switch corresponding to the proper push button is shorted; secondly, the step switch must remain in this position at least until the mechanism at the radio receiver has had time to complete the operation called for; and. thirdly, the return mechanism to bring the step switch back to its home position must be made to operate after all these functions have been performed.

The invention provides means to render the return mechanism on the step switch inoperative during the pulsing or stepping up of the step switch and also until the operation called for has been completed. After this is completed, the return mechanism returns the step switch to its home or initial starting position. In this way there will be a standard point or home position on the step switch from which each called for operation will start.

The invention will be more readily understood by referring to the following detailed description and the accompanying drawings. In the drawings, Fig. 1 is a circuit diagram of a carrier operated relay utilizing a cold cathode arc or glow discharge tube;

Fig. 2 illustrates an arrangement such as is shown in Figure 1 used to operate a step-switch which in turn controls the operation of a pushbutton type radio receiver;

Figs. 3a and 3b are circuit diagrams of two preferred arrangements of remote control units used to generate the proper number of impulses of control carrier and impress them upon a network;

Fig. 4a illustrates a vacuum tube carrier operated relay acting on a step switch to control the operation of a push button type radio receiver;

Fig. 4b illustrates a system like that shown in

Figure 6:
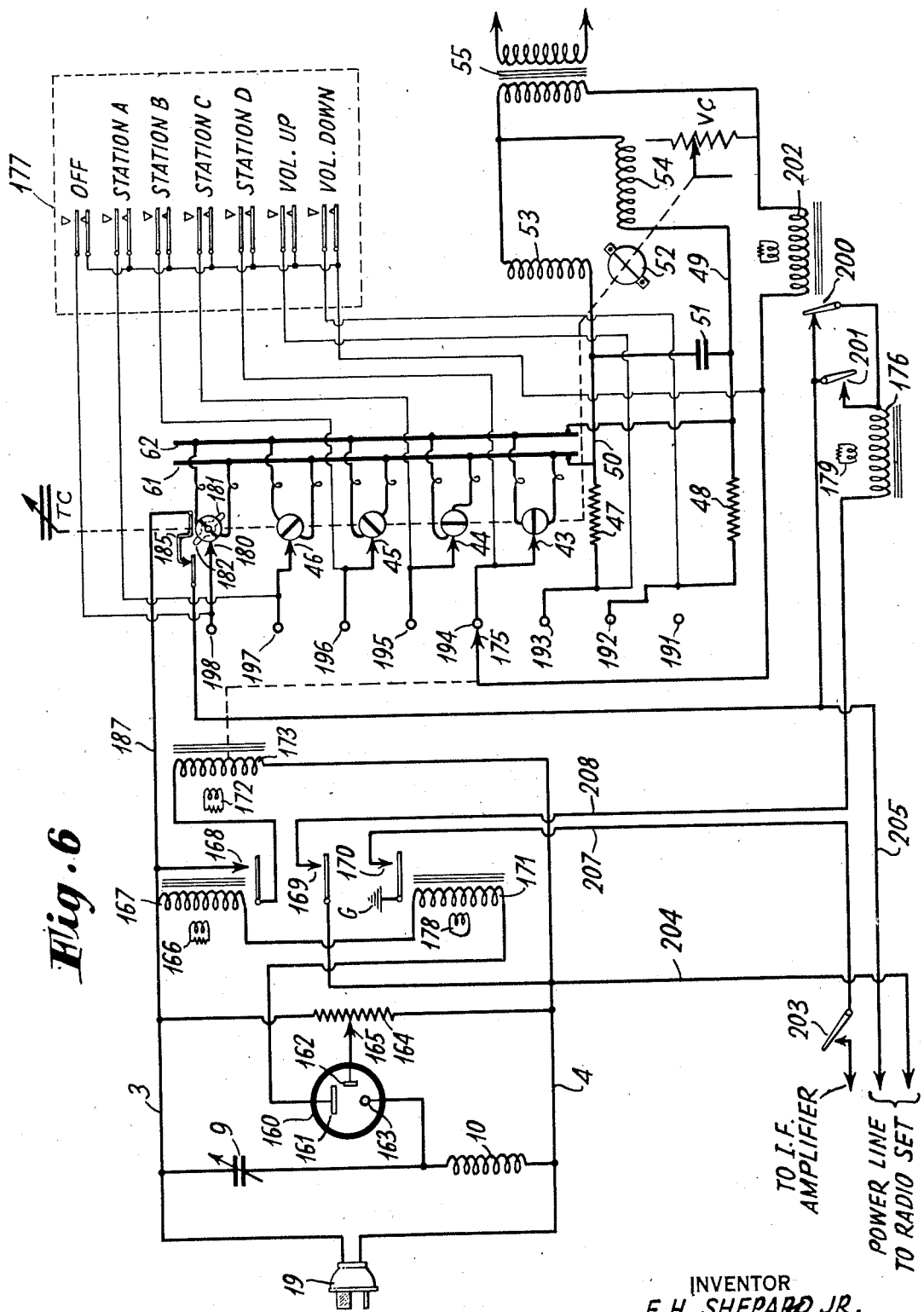

Fig. 4a except that it includes an antenna arranged to intercept the control energy;

Fig. 5 illustrates a circuit utilizing a two element glow or arc discharge tube; and, Fig. 6 illustrates the use of a three element gas tube for operating a step-switch.

In the carrier operated relay illustrated in Figure 1, a cold cathode arc discharge tube 7 is used which is available commercially and which has power handling capabilities sufficient to operate directly an insensitive relay such as a step switch requiring large amounts of energy in its stepping coil. The tube 7 is provided with four elements comprising a cold electrode 15, a first grid 16, a second grid 17 and an anode or plate 18. The cold electrode 15 in this type tube, sometimes referred to as a "cold cathode," will emit electrons in a manner well known to those familiar with such tube types and the art to which they pertain. In one particular tube of this type the cold cathode is activated with caesium and the tube is filled with an inert gas such as argon or neon or both. The tube has the property of conducting very large currents with an extremely small tube drop as well as the property that a relatively high voltage may be applied between the anode and the cathode without any conduction occurring until a discharge is initiated between any other two elements within the tube.

In Fig. 1, conductors 1 and 2 are intended to represent an A. C. light and power supply line such as is usually found in buildings supplied from a commercial electric light and power system. The space path of tube 7 is effectively connected across the power line conductors 1 and 2 by the connection of anode 18 of the tube to conductor 3 through a relay winding 11 and the connection of electrode 15 directly to conductor 4. A by-pass condenser 8 is shunted across the relay winding 11. Grid 16 of tube 7 is connected to both power line conductors in one case through an inductor 10 and conductor 4 and in the other case through the condenser 9 and conductor 3. Condenser 9 and inductor 10 form a series resonant circuit across the power supply line which acts to build up control carrier currents impressed upon the power supply line as will be described hereinafter. Grid 17 of the tube 7 is, in effect, connected to both power line conductors 1 and 2 by connection thereof to a tap 6 on an impedance 5 connected between conductors 3 and 4. Relay winding 11 operates a switch 12 which may be used to control any electrical circuit connected to it through terminals 13 and 14.

From a study of the circuit shown in Fig. 1, it is clear that the power line voltage is impressed between the anode 18 and cathode 15 of tube 7 and that the position of tap 6 on resistor 5 determines the voltage impressed upon the grid 17. A discharge initiated between grid 16 and grid 17 creates ions within the gas which thereupon enable a discharge to be initiated or take place between the cathode 15 and plate 18. Once a discharge is initiated it can be extinguished only by removal of the voltages to the elements. As the circuit is operated on the raw alternating current available across the power line 1, 2, the discharge in tube 7 is extinguished every time 18 becomes negative with respect to 15, and, therefore, must be re-initiated once each cycle of the supply. The design of the tube 7 is such that discharges taking place in the reverse direction, that is, from 18 to 15 are of limited magnitude due to the shielding action of grids 16 and 17 and poor activation on the anode. Special precautions are often necessary to limit this back current in the manufacture of the tube but since this is not within the scope of the present invention, it will not be further discussed herein. The bias voltage on grid 17 is applied from point 6 on the potential divider 5 which may comprise any type of impedance, that is, it may be resistance, capacitance or inductance. In operation the tap 6 is adjusted along 5 until the peak value of the potential on grid 17 is slightly less than the value necessary to start a discharge between grid 16 and grid 17 or between cathode 15 and grid 17. The structure of the tube is such that extremely high voltages between grid 17 and plate 18 are necessary to initiate a discharge. The grid 16, for frequencies of the power supply, is essentially grounded to the cathode 15 through inductance 10. However, a carrier voltage of the proper frequency applied across the line 1, 2 will result in relatively high amplitude circulating currents flowing through the series resonant circuit 9, 10 in a manner known to those familiar with the art.

Since this high circulating control current will result in a high voltage being built up across inductor 10 or condenser 9, this voltage appears between the cathode 15 and grid 16 and is thereby effectively added to the normal power supply line potential between grid 16 and grid 17 with the result that the potential between these grids is increased to such a value that a discharge between grid 16 and grid 17 will take place. This discharge is of sufficient magnitude to cause ionization in the tube and thus cause the discharge to take place between the cathode and the anode of the tube which in turn operates the relay 11 and, hence, switch 12. It is to be understood that this action can only take place during the half cycles of power supply voltage when anode 18 is positive with respect to cathode 15.

In the form of the invention shown in Fig. 2 for the remote control of a radio receiver, a cold cathode arc discharge tube of the same type as described in Fig. 1 is fired by control carrier pulses on the power supply line and energizes the coil of a step relay and the coil of a quick acting slow release relay. The stepping relay is arranged to perform the various functions performed by pressing the various push buttons of a push button controlled radio receiver after which it returns to its starting position and is ready to receive another train of control pulses.

The device shown in Fig. 2 of the drawings is connected to the conductors of the power supply line (not shown) through a polarized plug 19. The tube 7 is associated with the conductors of the power supply line in the same manner as described in Fig. 1. However, in the arrangement shown in Fig. 2 a step coil 22 is connected to the circuit and replaces the relay coil 11 of Fig. 1 and the step coil 22 operates the step switch arm 29 to connect the arm 29 to any one of the contacts 30 through 42 depending upon the number of control carrier frequency pulses received over the power line. The step coil 22 operates a pawl 304 against the pull of a returning spring 306 to turn the ratchet wheel 300 against the force of returning spring 301. Ratchet wheel 300 is connected to arm 29 through a suitable means represented generally by the dot and dash line 305. In this way the returning spring 301 also acts, under certain conditions hereinafter referred to, to force the arm 29 back to its home position 30 against stop 309 mounted on disk 310. A quick acting slow release relay winding 20 connected across the step coil 22 acts upon a switch 21 which with a relay winding 27, a switch 26, a return coil relay winding 24 and a switch 23, forms a series circuit connected between conductors 3 and 4. The return coil relay 24 when energized operates a dog 302 against the force of a returning spring 303 to release the ratchet wheel 300 and thereby permit spring 301 to return the mechanism including arm 29 to its home position. The operation of switch 23 is controlled by the movable arm 29 which acts to maintain switch 23 open when arm 29 is in the home position 30 and closed at all other positions. For this purpose arm 29 is provided with a depending portion 307 preferably constructed of insulation material which holds switch 23 open when arm 29 is in its home position 30 and allows a spring 308 to close switch 23 in all other positions of arm 29. The operation of switch 26 is controlled by a relay winding 25 connected between the movable arm 29 of the step switch and one end of the secondary of power transformer 55 through a switch 28 which in turn is controlled by the winding 27.

The push button tuning unit has not been shown in detail since such units are well known. Consequently, only those parts of the unit are illustrated and described which are believed to be necessary for a proper understanding of the present invention. In this device, as shown schematically by the dash line connection, the shaft of a reversible motor 52 may be coupled either to the shaft of the variable tuning condensers TC of the radio receiver in any suitable manner and to the shaft of the station setting commutators 63–66 inclusive only four of which have been shown for convenience, or to the shaft of the volume control device VC, depending upon the voltage applied to the motor. The motor may be a 23 volt displaceable armature capacitor type A. C. motor arranged to be geared to the condenser shaft or to the volume control potentiometer through suitable gear trains. The motor circuits are arranged so as to control the direction in which the motor rotates. The motor is also arranged so that if an operating voltage of say, 18 volts. is applied to it, as when it is energized through the resistors 47 or 48 the motor armature is not displaced and engages the volume control shaft. Increasing the voltage to the normal voltage of 23 volts causes the motor to speed up and its armature to be displaced axially in such a direction as to disengage the volume control connection and engage the condenser shaft and the shaft of the station setting commutators. A suitable type of motor and connections therefor are described in detail in U. S. Patent to Hopkins 1,999,359 issued April 30, 1937.

The reversible feature of the motor is made use of to operate the volume control shaft in either direction for increasing and decreasing the volume and also to operate the station setting commutators and condenser shaft in either direction so that during a tuning operation the motor seeks a newly called for position via the shortest path. For this purpose, it will be noted that the commutators 64 through 66 are split, that is, each one is made in two sections separated by a strip of insulating material. The respective halves of each commutator are connected to the conductors 61 and 62 which in turn are connected respectively to the motor windings 53 and 54 of the motor assembly. Wipers 43 through 46 cooperate with the station setting commutators and determine the direction in which the motor shaft is turned and also stop the motor when on the insulation strips between the segments. The motor energizing circuit derives its energy from transformer 55 which is connected to the power supply line in any suitable manner. A suitable type of motor and commutator assembly is fully described in U. S. Patent to Garrett 1,956,419, issued April 24, 1934. A further description of the type of motor and control circuits adapted to be operated in the device shown in Fig. 2 will be found in the U. S. Patent to Seeley 2,245,829, issued June 17, 1941.

The "on" and "off" switch for the radio receiver is shown generally at 57. This switch is controlled by the two windings 56 and 58 and stays put in either position after operation. It will be noted that the winding 56 is connected between terminal 39 of the step switch and arm 29 through a conductor 60, the secondary of the transformer 55, switch 28 and winding 25. The winding 58 on the other hand is connected between terminal 41 of the step switch and arm 29 through conductor 59, the secondary of the power transformer 55, switch 28 and winding 25. Considering now the terminals 30 through 42 of the station switch, it will be noted that terminal 30 is not connected to anything, that is, it is left blank; terminal 31 is connected to arm 29 through the voltage reducing resistor 47, motor winding 53, the secondary of transformer 55, switch 28 and winding 25; terminal 32 is left blank; terminal 33 is connected to arm 29 through voltage reducing resistor 48, motor winding 54, secondary of transformer 55, switch 28 and winding 25; terminal 34 is left blank; terminal 35 is connected to the wiper or brush 43 which cooperates with the station setting commutator 66. Terminal 35 may be connected to arm 29 through either one of two paths depending upon the position of the station setting commutator 66. For instance, the terminal 35 may be connected to arm 29 through the brush 43, the left hand section of the station setting commutator 66, the conductor connecting this section of the station setting commutator to bus bar 61, conductor 50, motor winding 53, secondary of transformer 55, switch 28 and winding 25. If the station setting commutator is rotated, let us say, 180 degrees from the position shown, then terminal 35 would be connected to arm 29 through a circuit comprising the brush 43, the other half of the station setting commutator 66, the connection between said other half and bus bar 62, conductor 49, motor winding 54, secondary of power transformer 55, switch 28 and winding 25.

The above shows clearly how the reversing action of the motor takes place depending upon which half segment of the station setting commutator is in contact with the brush 43 at the time the arm 29 contacts the corresponding contact point 35. It should be noted that these station setting commutators are set so that the condenser is rotated to the proper setting for the particular station set for, when the insulation portion of the commutator corresponding to the desired station reaches the brush at which time the motor circuit is, of course, interrupted. The connections of terminals 36, 37 and 38 to arm or sliding contact 29 through either of two paths is similar to that described above in conjunction with the terminal 35. It is only necessary to note that each one of the station setting commutators is set so as to break the motor circuit at a different position corresponding to some different station desired. Terminal 39 is connected to arm 29 through the conductor 60, relay winding 56, secondary of power transformer 55, switch 28 and relay winding 25. Terminal 40 is left blank, terminal 41 is connected to arm 29 through the conductor 59, winding 58, secondary of power transformer 55, switch 28 and relay winding 25. Terminal 42 is left blank.

Referring to Fig. 2 the operation of the system is as follows:

To energize or turn on the receiver the user will dial No. 9 on his control switch at the remote point which will send out a train of nine pulses of control carrier frequency on the power line across which there is connected the series tuned circuit including inductance 10 and condenser 9. As this circuit is resonant to the frequency of the control carrier, a carrier frequency voltage will be built up across inductor 10 and condenser 9 and will appear between the grid 16 and the cold cathode 15 of the tube 7. It will also appear between grid 16 and grid 17. By adjusting contact 6 of potentiometer resistance 5 a potential is established between grids 16 and 17 that just fails to strike an arc therebetween on the positive half cycles when no signal carrier voltage is on the line. When the carrier frequency voltage appears due to the tuned circuit an increased voltage is produced between grids 16 and 17, the breakdown potential between these elements is exceeded and a glow occurs. This creates ionization within the tube 7 which causes a glow to be established between cathode 15 and plate 18. The glow discharge changes into an arc discharge as the current rises and the plate to cathode drop in the tube drops to the arc discharge potential. This discharge of tube 7 extinguishes itself when the plate voltage drops below zero, that is, when the potential of plate 18 becomes negative with respect to the cathode due to the alternating current supply. The discharge will be reestablished on the next positive half cycle of the power supply line voltage, the control carrier frequency being still present on the line. Part of the current passed by the tube 7 passes through the coil of the step relay 22 and part passes through the coil of the quick acting slow release relay 20. The step relay 22 advances the step switch arm 29 one step or notch for every pulse of carrier energy received, while the operation of the quick acting slow release relay 20 causes the normally closed switch 21 to open. As soon as the step switch arm 29 is advanced away from its home position 30, normally open switch 23 is automatically closed. However, the return coil 24 cannot become energized because switch 21 of slow release relay 20 is open as long as the dialing pulses continue to be received by the tube 7. In the assumed case the nine pulses advanced the arm 29 step by step to the contact 39 which energized relay 56 and closed the switch 57 which is the on-off switch of the receiver. This energized relay 25 and opened switch 26, thus preventing operation of the return or homing relay 24. The user next would transmit one more pulse which would step the arm 29 up to the blank contact 40. This interrupts the current in coil 25 and energizes relay 24 and the arm "homes" to contact 30. The relay 24 is then deenergized by opening switch 23. In thereafter selecting a desired station the step switch is advanced, say, five notches to point 35 by dialing five pulses, the tuning mechanism of the push button controlled radio begins to operate and the motor 52 draws the full current which unclutches the motor from the volume control and clutches it to the tuning control. The motor current passes through relay 25 and causes normally closed switch 26 to open. Contact 26 is in series with the return coil 24 on the step switch and so provides additional means to prevent the return coil from operating its switch 23. As the dial pulses have ceased before the motor 52 has completed the tuning operation, relay 20 after a short period of time drops out and causes contact 21 to close. The return coil 24, however, cannot operate because contact 26 is open as just described. When the motor 52 moves the tuning device and the commutator 63—66 to the point where the brush 43 on commutator 66 will rest on the insulated segment of the commutator 66 the current to the tuning motor 52 will be interrupted, hence, stopping the flow of current through relay 25 which in turn causes closure of switch 26 thereby causing energization of the return coil 24. Energization of return coil 24 causes the step switch arm to drop back to its home position thereby opening switch 23. When switch 23 is opened the return coil is deenergized and the step switch is ready for another operating cycle.

During the time that the return coil is energized and the step switch arm is returning to its home position 30, the relay coil 27 is energized causing its switch 28 to open. This prevents the tuning mechanism on the push button controlled radio from drawing any current during the time that the slider 29 on the step switch comes in contact with the other contact points on its way back to the home position and thus prevents the radio from being detuned during the return part of the cycle.

To obtain the desired volume the user will dial, say, one pulse and this will step the arm 29 to point 31 and since the motor 52 is energized through resistor 47 it rotates in one direction with reduced voltage applied to it. As previously pointed out, the construction of the motor 52 is such that with full voltage applied, the armature is displaced against a spring causing it to engage with the receiving set tuning mechanism. If the voltage applied to the motor is insufficient to cause the armature to displace the spring the tuning mechanism is unclutched from and the volume control is clutched to the motor and is operated. Current drawn from the motor during this operation passes through the relay 25 and prevents the return mechanism from working as explained above.

When the desired volume change has taken place another pulse is dialed at the control point which causes the step switch to advance another notch to position 32 which is blank. This allows relay 25 to release closing switch 26, causing the return coil 24 to be energized and the step switch to return to the home position. Where it is desired to change the volume in the other direction three pulses are dialed at the controlling point with the result that the step switch advances to the third position 33. Since in this case the winding 54 of the motor is energized through the resistor 48, the volume control is operated in the opposite direction. When the volume has been changed the desired amount, another pulse is dialed, the step switch advances to the position 34 which is blank, which cuts off the current through relay 25, allows switch 26 to close and the return coil 24 of the step switch to be energized and cause arm 29 to be returned to the home position 30.

It is to be understood that operating the relays with alternating current may cause undesirable chattering so that under these circumstances it is desirable to shade relays 20, 22, 24, 25 and 27 in any suitable manner. An effective shading action may be obtained by winding one or more turns of uninsulated copper wire around a part of the magnetic coil of each relay.

Figure 3a illustrates a circuit arrangement used to generate the control carrier frequencies and to apply the proper number of pulses thereof to the power line in accordance with the control action desired. In this circuit a quick heating cathode type tube 85 is connected in an oscillator circuit in such a manner that the circulating tank currents pass through the power line. This method of use of the oscillator automatically matches, to a limited degree, the output of the relatively high impedance oscillator tube to the relatively low impedance of the power line, thus, coupling a sufficient amount of the generated high frequency energy into the power line to provide the desired controlling action. The filament 78 of the oscillator tube 85 is heated by A. C. power line current passing through a suitable resistance which may be a lamp 74 in series with the filament 78. Plate voltage is applied through one-half of the tank circuit from one side 84 of the power line. The number of pulses impressed on the power line is controlled by a telephone type dial switch 73. An RCA type 99 tube is admirably adapted for use in this circuit since this tube has a thoriated tungsten filament which is very quick in coming up to operating temperature. Because of this, it is possible to use the contact 71 of an automatic telephone type dial switch 73 to light the filament, it being understood that switch 71 is closed the moment the dialing mechanism is moved away from the home position. Contact 72 of the telephone dial mechanism 73 is used to interrupt the plate circuit of tube 85 in accordance with the number of pulses it is desired to transmit. It is to be understood that if a slow heater type filament tube is used in this circuit a manually operated switch must be used (see switch 97 of Fig. 3b) to replace or supplement the contact 71 of the telephone dial switch 73 so that the filament of the tube can be brought up to its required temperature before starting operation of the dialing mechanism. Contact switch 72 is closed during the return of the dial to its home position, the number of pulses being in accordance with the number dialed. Since the dialing mechanism is common practice in telephone work it is thought that it need not be described in detail herein.

For certain purposes to be hereinafter mentioned, it is convenient to provide the remote control unit with a switch other than the telephone dialing device which will automatically transmit one or two impulses over the power line. For this purpose the oscillator circuit of Fig. 3a is provided with an auxiliary switch device comprising a switch including an operating handle 98 and a pair of movable elements 86 and 87 connected for simultaneous operation by means schematically shown by the dash line connection. The element 86 cooperates with three switches 93, 94 and 95 and the arms 87 cooperates with two sets of contact strips 90a, 90b, and 91a, 91b. The arm 87 is preferably constructed so that its lower portion is composed of conducting material so that in any position other than the released position which is that shown in the drawings, the cooperating bars are short-circuited. The movable elements of the three switches 93, 94 and 95 are each connected to conductor 75. The fixed contacts of the three switches are connected to the line 84. Contact strips 90a and 91a are connected to the conductor 70 through conductor 92 and contact strips 91b and 90b are connected to the conductor 75. In order to limit the movement of the element 86 the fixed contacts 88 and 89 of switches 93 and 95 respectively are made so as to act as stops for this purpose. The movement of the arm 87 is limited by the stops 96 and 97 which are preferably constructed of insulation material so as to avoid short-circuiting the contact bars. Movable elements 86 and 87 of the switch are normally maintained in the released position shown, by any suitable resilient means not shown. It will be seen that when the handle 98 is rotated clockwise the oscillator will transmit a train of oscillations as long as the switch handle is held so that the switch 93 is closed and the contact bars 91a and 91b are short-circuited. Short-circuiting of the contact bars is the same as closing switch 71 of the telephone dial whereas closure of switch 93 is the same as closing switch 72 of the telephone dial. From the above it is evident, of course, that the operation of switch handle 98 as described will transmit an impulse over the power supply line and that this pulse will be of controllable duration, that is, it will last until the switch handle 98 is released. If the switch handle 98 is moved to the limit of its movement in the opposite direction to that previously described, then the switch 71 is short circuited when the movable contact 87 short circuits bars 90a, 90b. The plate circuit of the tube will be energized for a short interval of time when the movable contact 86 closes switch 94 momentarily thereby sending out one pulse of carrier energy, then carrier energy is again transmitted over the power line when the movable element 86 closes switch 95 which remains closed as long as 86 is held against stop 89. Carrier energy or an impulse of controllable duration is generated and impressed upon the power line until the switch is allowed to resume its normal position.

In Fig. 3b there is shown an arrangement wherein a switch 97 is provided for the purpose of connecting the tube 85 to the power supply line. Hence, when the switch 97 is closed the cathode of the tube 85 becomes energized through the circuit comprising conductor 68, switch 97, conductor 101, tube 74, filament 78 and conductor 99. In this case telephone dial 100 need be provided with only the single switch 102 which is used to make and break the plate circuit of tube 85 to determine the number of carrier impulses transmitted over the power line depending upon the number dialed. Since "on" and "off" switch 97 is provided, the auxiliary switch need have only one section.

In operation, moving the switch arm 98 clockwise causes the movable element 86 to close switch 93 and to hold it closed as long as 86 is held against stop 88. This causes a train of oscillations to be transmitted over the power supply line. The transmission is stopped as soon as the switch handle 98 is allowed to assume again its normal position as shown. If the switch handle 98 is moved counterclockwise so that arm 86 comes up against the stop 89, a carrier frequency pulse of fixed duration will be transmitted when movable element 86 closes switch 94. When the movable element 86 passes beyond the switch 94, the switch will open again thereby stopping the pulse of energy transmitted. However, carrier energy will again be transmitted when the element 86 closes switch 95. This last named transmission of carrier energy will be of controllable duration since it will continue as long as the element 86 is held against the stop 89.

The arrangement of the switches 93, 94 and 95 in both Figures 3a and 3b is such that the switches are closed only with movements of element 86 in the directions from the neutral position toward either of the stops 88 and 89 and not in the directions from the stop toward the neutral position.

Fig. 4a illustrates a modification of the invention using a vacuum tube carrier operated relay for operating a step switch to perform certain desired controlling operations. In this modification the three element tube 108 is provided with an anode 111, a control electrode 110 and a cathode 109. The tube is connected to the power supply line (not shown) by a plug 19. In this case the plug need not be a polarized plug. The plug 19 effectively connects the conductors 3 and 4 to the usual two conductors of a commercial power supply line. Connected across the conductors 3 and 4 is a series resonant circuit comprising inductor 10 and condenser 9. The tube 108 is effectively connected between the conductors 3 and 4 by a connection from the anode 111 to the conductor 3 including a relay winding 113 in series with a carrier frequency choke 107. To energize the cathode 109 one side of it is connected directly to the conductor 4 and the other side is connected to the conductor 3 through a condenser 106 and the choke 107 in series. In this way the cathode 109 of the tube 108 receives its heating current through condenser 106 and carrier frequency choke 107 from the power line. The control electrode 110 of the tube 108 is connected to a point intermediate condenser 9 and inductor 10 of the series resonant circuit through a resistor 105 shunted by a condenser 104. Resistor 105 is for the purpose of allowing the D. C. potential to leak off condenser 104 within a short period of time but which is relatively long with respect to the power supply cycle. Choke 107 is utilized to prevent carrier frequency current from passing through and affecting the temperature of the cathode 109. Relay winding 113 acts upon a switch 114 which controls the energization of relay winding 116. In other words, with the switch 114 closed, relay winding 116 is energized since it is then connected across the conductors 3 and 4. The relay winding 116 acts upon a switch 117 which when closed connects a relay winding 118 across the line 3, 4. The relay winding 118 also may be connected directly across the line 3, 4 through the intermediary of switch 130. A step switch arm 129 cooperating with a plurality of contacts 120 through 128 is connected to a push button controlled receiver.

This receiver is provided with a reversible motor 52 similar to motor 52 of Fig. 2 having the motor windings 53 and 54, station commutators 63 through 66 cooperating with the contact elements 46, 45, 44 and 43 respectively, "on" and "off" switch 57 and a motor controlled switch 130. Switch 130 is closed when the armature of motor 52 is displaced sideways during a tuning operation as previously described. The step switch arrangement is somewhat similar to that heretofore described except that four less contact positions are needed than in the arrangement shown in Fig. 2.

The device shown in Fig. 4a operates as follows: Carrier frequency pulses applied across the power supply line to which the plug 19 is connected build up a resonant carrier frequency voltage across inductor 10 and condenser 9 in such a manner that the carrier frequency voltage appears between grid 110 and cathode 109 of tube 108. This carrier frequency voltage appearing between the grid and cathode results in a rectified current being drawn from the cathode 109 to the grid 110 whereby the condenser 104 is charged to a D. C. potential which is comparable in magnitude to the carrier frequency voltage appearing across the inductance 10 in a manner known to those familiar with the art. The negative potential built up across condenser 104 is instrumental in reducing the plate current of tube 108 in such a manner that the pulsing relay coil 113 does not receive sufficient current to hold the contact 114 open.

It should be understood from what has preceded that the carrier generator circuit shown in Figs. 3a and 3b is such that the carrier appears in phase with one half of the power cycle thus making it necessary in some instances, as, for instance, in the arrangement shown in Fig. 2, to polarize the receiving unit with respect to the pulse generating unit. In the circuit shown in Fig. 4a there will be a difference in operation with a change in polarity of the plug 19, that is, when the carrier frequency appears on the half of the power cycle at which the plate voltage to the relay tube is negative, the reduction of plate current on the next half cycle will be greater than would be the reduction in plate current if the carrier voltage appears during the half cycle that the plate voltage of the relay tube was positive. It is to be noted, however, that this circuit is operable with either polarization. It is to be noted that inductance in the line is included between the cathode and plate of the tube 108. If the plate were by-passed to the side 3 of the line, a simple Hartley oscillator circuit would result and tube 108 would oscillate at a frequency determined by the value of inductance 10 plus the line inductance tuned by condenser 9. To effectively kill this oscillation circuit the plate 111 of tube 108 is returned to the side 3 of the line through relay coil 113 and R. F. choke 107. To prevent chattering the armature of the step coil 116 is shaded by coil 115 which may take the form of a single turn of uninsulated copper wire wound around a part of the magnetic coil, so as to allow operation on alternating current.

Each time the step coil 116 is energized by the dialed signal pulses the step relay arm 129 is advanced one step and switch 117 is momentarily closed. This energizes the anti-return coil 118 which operates a quick acting slow releasing mechanism to prevent the step switch from returning to its home position as long as switch 117 is momentarily closed and opened in fairly rapid succession. The arm 129 of the step switch is advanced to the desired position and the push button controlled radio starts to tune. While the motor is performing a tuning operation, switch 130 is closed thereby maintaining coil 118 energized which as stated prevents the step switch from returning. As switch 117 is closed only when the step coil of the relay is energized, the return mechanism will be operated when switch 130 is released as soon as the automatic tuning mechanism of the radio has finished its function. The volume control may be accomplished by dialing one pulse to increase volume and two pulses to decrease volume. Switch 130 is closed only during the tuning operation of the motor and not closed during the volume control operation since at reduced voltage the motor armature is not displaced. Hence, it is necessary to make the last pulse dialed for a volume control operation (which is the first and only pulse in volume reduction), a sustained pulse, that is, sustained until the desired change in volume has been accomplished. As soon as this pulse ceases, switch 114 opens, the step switch stepping coil 116 is deenergized, switch 117 opens and the anti-return coil 118 is deenergized allowing the step switch arm 129 to snap back to its home position 120. This eliminates the necessity for blank positions on the step switch. The turning "on" and "off" of the radio would first be completed simply by dialing the desired number to place the step switch arm 129 on the contact 127 or 128. No blank positions are necessary to operate the return mechanism as the switch 114 opens when the signal pulses cease after contact is made with 127 or 128, and the step switch thereupon returns to its home position.

The volume control operation may be performed by means of the auxiliary switch 98 shown in Figs. 3a and 3b. For instance, operation of the switch handle 98 clockwise in either arrangement will be the equivalent of dialing "one" on the automatic telephone dial mechanism 73 and this will cause the motor 52 (Fig. 4a) to operate the volume control device so as to increase the volume. This increase in volume continues until the operator releases the switch handle 98 thereby allowing the switch to return to its normal released position. Operating the switch handle in the opposite direction will be the equivalent of dialing "two" on the telephone dial and will decrease the volume. Here again the motor continues to operate the volume control device due to the sustained second pulse until the operator releases the switch 98.

It is, of course, possible to operate the tuning instrumentality of a radio receiver with one electric motor and the volume control device with another electric motor. Such an arrangement is shown in Fig. 5 of the drawings wherein 139 is the tuning motor and 144 is the volume control motor. Both motors are of the reversible type but only the tuning motor need have a displaceable armature or a relay connected in series or in parallel with the motor, to operate switch 130. In the arrangement shown in Fig. 5 use is made of a two element glow or arc discharge tube 131 in which the breakdown potential is such that the peak line voltage is not sufficient to start the discharge. However, the tube will break down or start when the potential between the two electrodes 132, 133 thereof is slightly in excess of this value. Once the tube is fired it will conduct at a potential considerably below the breakdown potential. The tube 131 is effectively connected across the conductors 3 and 4 which in turn are connected by means of a plug 19 to the two conductors of a power supply line. In this case the plug 19 need not be a polarized plug. A series resonant circuit including an inductor 10 and a condenser 9 is connected between the conductors 3 and 4 in a similar manner as the arrangement shown in Fig. 4a. One of the elements 132 of the two element discharge tube 131 is connected to a point of the series resonant circuit intermediate the inductor 10 and the condenser 9. The other electrode 133 of the tube is connected to the conductor 3 through stepping coil 134. Stepping coil 134 operates a switch 135 which acts to connect an anti-return coil 137 which may be an A. C. operated slow release air dash pot type relay across the conductors 3 and 4. The stepping coil 134 also operates the step coil arm 138. This step coil arm cooperates with the contacts 151 through 159 of the step switch mechanism. Switch 130 cooperates with the motor 139 and provides a shunt circuit across switch 135 for connecting the anti-return coil 137 across the line 3, 4 to provide an anti-return circuit effective while motor 139 is energized. The "on" and "off" switch 57 for the radio receiver is operated in one direction by the coil 56 and in the other direction by the coil 58. The station setting commutator discs 63 through 66 are of the same construction as those shown in Figs. 2 and 4a and determine the direction and amount of rotation of the tuning motor 139. The home position of the step switch is the contact point 151 which is blank, that is, this contact point is not connected to anything. From the description of the previous figures it is evident that when the step switch arm 138 is positioned on the contact point 152, the motor 144 will be energized through its motor winding 145, secondary winding of power transformer 55 and arm 138. This will operate the motor 144 in one direction. To operate the motor in the other direction the step switch is operated so that arm 138 contacts point 153. This will energize the motor through the coil 143 and reverse its direction of rotation. The motor is coupled in any suitable fashion to the volume control shaft. Hence, the volume control can be operated in either direction.

The operation of the tuning motor 139 is the same as described in connection with Fig. 4a. The same is true of the "on" and "off" switch 57.

Where for one reason or another it is desirable to use a three element gas tube, such, for instance, as an RCA OA4-G type tube or a WE 313A type tube for controlling the operation of the step switch, an arrangement such as that shown in Fig. 6 may be utilized. In Fig. 6 the polarized plug 19 is used to connect the circuit to a power supply line which, in effect, impresses the power supply line potential between the conductors 3 and 4. The three element gas tube 160 comprises a cold cathode-like element 163, a main anode 161 and starter-anode 162. This tube is known in the art as a cold cathode glow discharge tube and the discharge can be initiated with a very small amount of electrical energy supplied to the starter anode circuit. This feature of the tube makes it practicable to obtain remote control of line operated electrical devices by means of an electrical impulse generated, say at radio frequencies and transmitted over the same power line. Condenser 9 and inductance coil 10 form a tuned circuit which is connected between the conductors 3 and 4 in the same manner as the arrangement shown in some of the other figures of the drawings. A bleeder circuit comprising a resistor 164 is also connected between the conductors 3 and 4 and the starter anode 162 is connected to a slider which operates along the bleeder resistor 164. The cold cathode 163 is connected to a point of the tuned circuit which is common to the condenser 9 and inductor 10. The anode or plate 161 of the tube 160 is connected to conductor 3 through relay windings 171 and 167 in series.

In the arrangement thus far described substantially the full line voltage is applied between the anode 161 and cold cathode 163 of the tube 160. The starter anode is biased, that is, it is maintained at a potential just below that required for breakdown by means of the connection to the bleeder circuit 164. The inductance 10 and the condenser 9 constitute a tuned circuit in series with the line. Thus, when a carrier energy having the frequency of the tuned circuit is impressed on the power line a resonant voltage appears across elements 9 and 10. The effect of the voltage across the condenser 9 is to increase the negative potential peaks on the cold cathode 163 and thereby increase the potentials between cold cathode 163 and starter anode 162. These peaks start a discharge between the cold cathode and the starter anode thereby producing ionization which enables the discharge to take place between the cathode and the main anode 161 provided the circuit values are such that sufficient starter anode current flows. After the discharge occurs between the cold cathode and the main anode, current will flow through the relay windings 171 and 167. Because of the fact that the power supply line is alternating current, which means that A. C. is supplied to the anode 161, the tube 160 ceases to discharge at the end of the positive part of the power cycle when the carrier is removed.

It will be noted that most of the voltage on the starter anode required to cause breakdown is supplied by the bleeder circuit 164. As a result, the tuned circuit is required to supply only the difference between breakdown voltage and applied A. C. voltage. In setting up an arrangement like that shown in Fig. 6 precautions should be taken so that at the highest line voltage, the A. C. voltage applied to the starter anode 162 will not be sufficient to cause the tube 160 to break down and so that at the lowest line voltage the carrier voltage will be high enough to make up for the low line voltage. With an RCA OA4-G type tube suitable operation will usually be obtained by supplying an R. F. starter anode voltage having a minimum peaked value of 55 volts.

The relay winding 167 acts upon a switch 168 which in turn when closed connects the stepping coil 173 of a step switch between the conductor 3 and 4 thereby energizing the stepping coil. The relay winding 171 acts upon the antireturn switch 169 which prevents return of the step switch while dialing a number. This last named relay winding also acts upon a squelch relay switch 170. The stepping coil 173 acts upon the arm 175 of the step switch mechanism which operates along the contacts 191 through 188. In the step switch the contact 191 is blank, that is, it is not connected to anything. The contact 192 is connected through the voltage reducing resistor 48 to the motor winding 54 and then through the secondary winding of the power transformer 55, relay winding 202 to arm 175. Contact 193 is connected through the voltage reducing resistor 47, motor winding 53, secondary of power transformer 55, relay winding 202 to the arm 175. The station selector devices 43, 44, 45 and 46 are similar to those heretofore described in connection with some of the other figures in the case, and the contact points 194, 195, 196 and 197 are connected to whichever segments of the station selector devices happen to be in the contacting position. The contact point 198 is connected to a settable device 180 which is similar to the station setting commutators with the exception that it is provided with two projections 181 and 182 substantially at right angles to the strip of insulation between the two segments of the commutator. The projections 181 and 182 act to open the switch 185 when in a vertical position for the purpose of turning off the receiver. The motor 52 is a reversible motor of the same type as has heretofore been described. It should be noted that the relay winding 202 acts upon a switch 200 which is connected in series with homing relay winding 176 between switch 169 and switch 185. The relay winding 176 operates the switch 201 and is, in effect, a return mechanism for the station switch. Switches 170 and 203 are connected between ground and the cathode of an intermediate frequency amplifier tube of the receiver if a superheterodyne receiver is used, in order to squelch the radio set while the dialing operation is going on. The relay switch 200 is normally closed but is operated by the winding 202 to prevent return of the step switch while the tuning operation is going on.

In order to show how the mechanism is associated with a push button tuning device a common type of push button arrangement of a radio receiver has been shown generally within the dotted rectangle 177. It will be seen that in this case depressing the button marked "off" is the same as moving the step switch arm 175 up to the position 198. Depressing the push button marked "Station A" is equivalent to causing the arm 175 to contact contact element 197. The same is true with respect to the three buttons marked "Station B," "Station C" and "Station D" of the push button control with respect to contacts 196, 195 and 194. The push button marked "Volume up" corresponds to the contact point 193 and the push button marked "Volume down" corresponds to the contact point 192. In this way the set may be operated at the receiver by depressing the proper push buttons shown within the rectangle 177 or it may be operated from a remote point by transmitting the proper number of impulses over the power line to operate the step switch mechanism.

While the arrangements heretofore described are particularly adapted for remotely controlling electrical apparatus over a power supply line it is, of course, obvious that the controlling frequency may be transmitted over any line and even as radio waves without the use of any artificial conductors at all. In the latter case the controlling frequency may be impressed upon the trigger tube as for instance tube 160 of Fig. 6 by intercepting the control energy with an antenna and tuned circuit arrangement tuned to the frequency of the transmitted control energy. The received energy may be amplified if necessary and then impressed upon the tube. This will, of course, have the same action on the tube as though the controlling energy were impressed upon the tube from the power supply line.

Figure 3C:
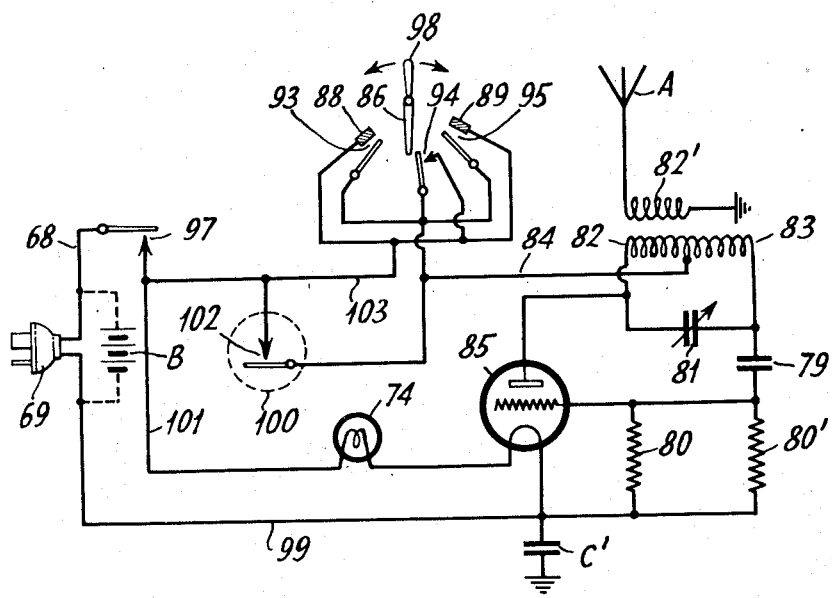
Fig. 3c illustrates a form of a remote control unit shown in Fig. 3b but adapted to transmit radio control waves through space by means of an antenna.
Figure 3D:
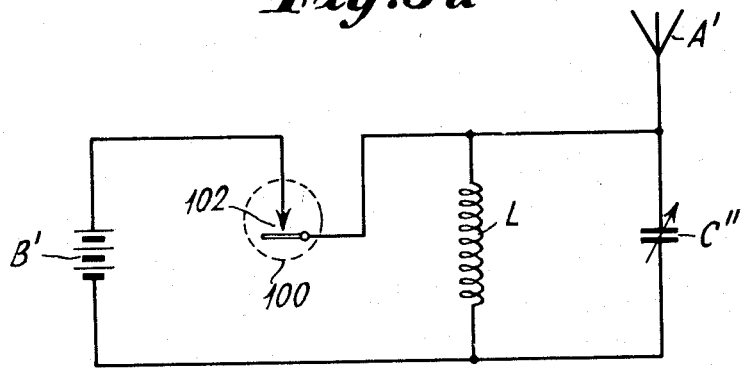
Fig. 3d illustrates a remote control unit especially adapted for short range work.

A system of this type is shown in Figs. 3c, 3d and 4b.

The arrangement shown in Fig. 4b is essentially the same as that shown in Fig. 4a, with the exception that in Fig. 4b the controlling energy is picked up by the antenna A and impressed between the grid and cathode of the tube 100 through the intermediary of tuned circuit 10 and 9', it being noted that the antenna A is coupled to coil 10 through coil 10'. The usual connection to ground is provided through a condenser C. It is apparent that the only reason for plugging in plug 19 into the power line in the case of Fig. 4b is to provide power for energizing the circuits. In conjunction with an arrangement such as that shown in Fig. 4b it is preferable to use a control frequency transmitter which transmits control radio waves from the controlling point to the controlled point. Two such transmitter arrangements are shown in Figs. 3c and 3d. Fig. 3c is essentially like the arrangement shown in Fig. 3b except that in Fig. 3c, the control energy is transmitted to the remote point by means of an antenna A which is coupled to the coil 82 of the tank circuit through winding 82'. In this case the filament of tube 85 is connected to ground through a condenser C'. The plug 69 of Fig. 3c is connected to the power supply line for the purpose of energizing the circuits. However, this is not necessary if a battery B is connected between conductors 68 and 99.

Instead of providing a generator of continuous waves a short train of waves may be set up by a make and break circuit such as shown in Fig. 3d. In Fig. 3d, 100 is the telephone dial which operates the make and break switch mechanism 102 according to the number of impulses it is desired to transmit. The telephone dial switch 102 acts as the make and break device which is in series with the battery B' and the tuned circuit comprising inductance L and condenser C".

The arrangement shown in Fig. 3d is essentially a spark transmitter except that instead of a continuous succession of sparks only one impulse is used for each actuation of the remote equipment. In other words, one impulse is used for each actuation of the step switch mechanism shown in Fig. 4b.

It is to be understood that equivalent systems to those described above are contemplated by the present invention and that the invention is to be limited only by the scope of the appended claims.

I claim:

1. In a radio receiver provided with an electric motor and an energizing circuit therefor for tuning the receiver to any one of a plurality of wave lengths, a step switch mechanism for controlling the operation of said motor, said step switch mechanism including a movable arm and a stepping coil arranged to step the arm from a home position along a series of contact points, means responsive to successive control pulses received at the receiver from a remote point for energizing the step coil with each pulse to thereby cause the step switch arm to advance from its home position a number of steps corresponding to the number of said successive pulses, means for returning the arm to its home position, means including a quick-acting slow-release relay operating to prevent the operation of said returning means while control pulses are being received during a control cycle of operation of the mechanism, and means operating as long as the tuning motor is in operation to prevent the operation of the returning means.

2. In a radio receiver provided with an electric motor and an energizing circuit therefor for tuning the receiver to any one of a plurality of wave lengths, a step switch mechanism for controlling the operation of said motor, said step switch mechanism including a movable arm and a stepping coil arranged to step the arm from a home position along a series of contact points, means responsive to successive control pulses received at the receiver from a remote point for energizing the step coil with each pulse to thereby cause the step switch arm to advance from its home position a number of steps corresponding to the number of said successive pulses, means for returning the arm to its home position, means including a quick-acting slow-release relay electrically connected with said stepping coil operating to prevent the operation of said returning means while control pulses are being received during a control cycle of operation of the mechanism, and means included in the circuit of the tuning motor preventing the operation of the returning means while the motor is in operation.

3. In a radio receiver provided with an electric motor and an energizing circuit therefor for tuning the receiver to any one of a plurality of wave lengths, a step switch mechanism for controlling the operation of said motor, said step switch mechanism including a movable arm and a stepping coil arranged to step the armature from a home position along a series of contact points, means responsive to successive control pulses received at the receiver from a remote point for energizing the step coil with each received pulse to thereby cause the step switch arm to be advanced from its home position a number of steps corresponding to the number of pulses received, means for returning the arm to its home position, a quick-acting slow-release relay electrically connected with the stepping coil and arranged so as to disable the returning means during the time that successive pulses constituting a cycle of operation of the mechanism are being received, means included in the circuit of the tuning motor preventing the operation of the returning means while the motor is in operation, and further means included in the motor energizing circuit operating to prevent energization of the motor during the time that the arm is returning to its home position.

4. In a remote control system of the type wherein controlling signal currents are transmitted from a remote point to a controlled point, a motor to be controlled and a circuit therefor, a power supply line, a step switch device, said motor circuit including a plurality of selectively operable means adapted to be selected in accordance with the operation of said step switch device for determining the extent of operation of the motor, a stepping coil mechanism energized by said controlling signal currents, said step switch device being adapted to be advanced step by step by the stepping coil mechanism from a starting position to any one of a plurality of positions and thereby select one of said selectively operable means, means cooperating with the step switch device for applying a force thereto which tends to return the switch mechanism to its starting position, a locking device for preventing the operation of said last named means, a return relay operatively connected to the locking device, an anti-return coil for said step switch device acting upon excitation thereof simultaneously with the energization of the stepping coil mechanism to render said return relay inoperative whereby the locking device prevents operation of the switch return means, means including a pair of switches in series for connecting the return relay across said power supply line, one of said switches being open when the step switch device is in its home position and closed when the step switch device is in any of its other positions, the other of said series switches being normally closed, means included in said motor circuit for opening said last named series switch only while the motor circuit is energized, and means acting upon excitation of the return relay for disabling the motor circuit during the time that the return relay is energized.

5. In a remote control system of the type wherein controlling pulses of signal currents are transmitted from a remote point to a controlled point, a motor the rotation of which is to be controlled in accordance with the number of pulses transmitted, a motor circuit including a plurality of selectively operable means each acting upon selective operation thereof to effect the rotation of the motor to respectively different positions, a power supply line, a step switch device having a plurality of contact positions corresponding to said plurality of selectively operable means, each thereof being connected with its corresponding one of said operable means, a stepping coil mechanism for said step switch energized by said controlling signal currents arranged to advance the step switch step by step from a starting position to any one of said plurality of contact positions to thereby select one of the selectively operable means, means acting upon the step switch device for applying a force thereto which tends to return the switch mechanism to its starting position, locking means normally positioned to prevent the operation of said last named means, a return coil operatively connected to the locking device acting after completion of a selecting operation by said step switch to unlock the step switch locking means to permit operation of the switch return means and means included in the motor circuit operative only while the motor is in operation for rendering said return coil ineffective to unlock the locking means whereby the step switch device is locked into the selected position during the operation of the motor.

6. The combination with a radio receiver provided with an operable volume control device an delectric driving means for operating the volume control device, of a step switch mechanism connected with said electric driving means for selectively controlling the operation thereof, operation of said step switch mechanism to a predetermined one of its positions acting to operate the volume control device substantially continuously and relatively slowly toward one extreme control position thereof and in another predetermined position to operate the volume control device in the same manner but toward the other extreme control position thereof, means for selectively generating and transmitting pulses of controlling signal currents, the number of pulses transmitted during any one cycle of operation of said last named means being determined by the number of steps it is desired to advance the step switch mechanism from its home position, means including a quick acting slow release relay device for returning the step switch to its home position after a time interval which is appreciably longer than the time interval between successive pulses of a train of control pulses during any cycle of operation whereby said step switch assumes its home position after the last pulse of a cycle of operation, and operable means for extending the time of transmission of the last impulse of the cycle of operation to thereby maintain the step switch in the desired position a length of time determined by the degree of volume change desired.

7. The combination with a radio receiver provided with an operable volume control device and electric driving means therefor, of a step switch mechanism connected with said electric driving means for selectively controlling the operation thereof, operation of said step switch mechanism to a predetermined one of its positions acting to operate the volume control device substantially continuously toward one extreme control position thereof and in another predetermined position to operate the volume control device in the same manner but toward the other extreme control position thereof, means for generating pulses of controlling signal currents including a keying device having a lever arranged so that movement thereof from its normal released position to one extreme position transmits a predetermined number of impulses of oscillations, the last pulse transmitted extending over a period of time determined by the length of time the lever is held in the extreme position, the number of pulses transmitted during any one cycle of operation of said keying means being determined by the number of steps it is desired to advance the step switch mechanism from its home position, means including a quick acting slow release relay device for returning the step switch to its home position after a time interval which is appreciably longer than the time interval between successive pulses of a train of control pulses during any cycle of operation whereby the step switch resumes its home position after the last pulse of a cycle of operation, said extended pulse acting to maintain the step switch in the desired position a length of time determined by the degree of volume change required.

8. In combination with a radio receiver having a tuning shaft and a volume varying means, a motor coupled to said tuning shaft, a plurality of energizing circuits for said motor, a plurality of control circuits for said volume varying means, a controller in each energizing circuit to de-energize said motor in response to movement of said shaft to predetermined positions, a step-by-step switch having a neutral position and a plurality of successive circuit closing positions, means responsive to a plurality of successive impulses to move said switch from neutral position to certain successive positions in which it closes successive control circuits and to other successive positions in which it closes successive energizing circuits, reset means adapted upon actuation to move said switch to neutral position, circuit means including a normally-closed switch for actuating the reset means, a relay actuated simultaneously with the impulse responsive means adapted to effect the quick opening of the normally-closed switch to thereby disable the reset means during reception of impulses and to effect a slow return of said switch after the reception of impulses and means responsive to the energization of said motor to control the effectiveness of said relay, whereby a reset operation is prevented until said motor has been de-energized.

FRANCIS H. SHEPARD, Jr.